United States Patent
Kinami et al.

[11] Patent Number: 5,567,758
[45] Date of Patent: Oct. 22, 1996

[54] THERMOPLASTIC POLYESTER RESIN COMPOSITION

[75] Inventors: Nobuyuki Kinami; Masami Okamoto; Yoshihiro Shinoda, all of Ohtsu; Tsuyoshi Sekura, Urawa; Akira Yamaguchi, Niigata, all of Japan

[73] Assignees: Toyo Boseki Kabushiki Kaisha, Osaka; Co-Op Chemical Co. Ltd., Tokyo, both of Japan

[21] Appl. No.: 515,609

[22] Filed: Aug. 16, 1995

[30] Foreign Application Priority Data

Aug. 26, 1994 [JP] Japan .................................. 6-202638
Jun. 2, 1995 [JP] Japan .................................. 7-137035

[51] Int. Cl.$^6$ .............................. C08K 3/34; C08K 3/16
[52] U.S. Cl. .................. 524/401; 524/443; 524/451; 524/493; 524/603; 525/437; 528/275
[58] Field of Search ...................... 524/443, 493, 524/401, 603, 451; 528/275, 281; 525/437

[56] References Cited

U.S. PATENT DOCUMENTS

| | | | |
|---|---|---|---|
| 2,653,918 | 9/1953 | Eckert | 524/443 |
| 3,222,299 | 12/1965 | MacDowell | 525/437 |
| 3,346,542 | 10/1967 | Koepp et al. | 528/275 |
| 3,356,641 | 12/1967 | Roedel et al. | 528/281 |
| 3,395,127 | 7/1968 | Dobinson | 528/281 |
| 3,506,619 | 4/1970 | Stewart et al. | 528/281 |
| 3,547,873 | 12/1970 | Weissermel et al. | 524/443 |
| 3,784,499 | 1/1974 | Krupnick et al. | 524/443 |
| 3,922,250 | 11/1975 | Cleary | 528/281 |
| 4,431,755 | 2/1984 | Weber et al. | 524/449 |
| 4,463,121 | 7/1984 | Gartland et al. | 524/291 |
| 4,705,844 | 10/1987 | Espenchied et al. | 528/281 |
| 5,030,680 | 7/1991 | Wilder et al. | 524/449 |
| 5,300,332 | 4/1994 | Kawaguchi et al. | 525/437 |

FOREIGN PATENT DOCUMENTS 60-4541  1/1985  Japan .

*Primary Examiner*—Veronica P. Hoke
*Attorney, Agent, or Firm*—Kenyon & Kenyon

[57] ABSTRACT

Compositions are described comprising thermoplastic polyester resins comprising polyester molecules ending in terminal groups, wherein all or a part of the terminal groups are represented by the general formula $—R—SO_3L$, wherein R is a divalent aliphatic hydrocarbon having 1–20 carbon atoms and L is an alkali metal; an inorganic compound mixture, wherein said inorganic compound mixture comprises one or more compounds selected from the group consisting of: inorganic compounds consisting of M, Mg, Si, O and F and inorganic compounds consisting of M, Mg and F, wherein M is an alkali metal; and wherein the energy of said composition satisfies the following formulas (1) and (2):

$$U \leq 1,300 \text{ (cal/mole)} \quad (1)$$

$$\sigma \times \sigma e < 2.8 \times 10^5 \text{ (cal}^2/\text{m}^4\text{)} \quad (2)$$

wherein U is an activation energy, $\sigma$ is a lateral surface energy and $\sigma e$ is a fold surface energy.

6 Claims, 1 Drawing Sheet

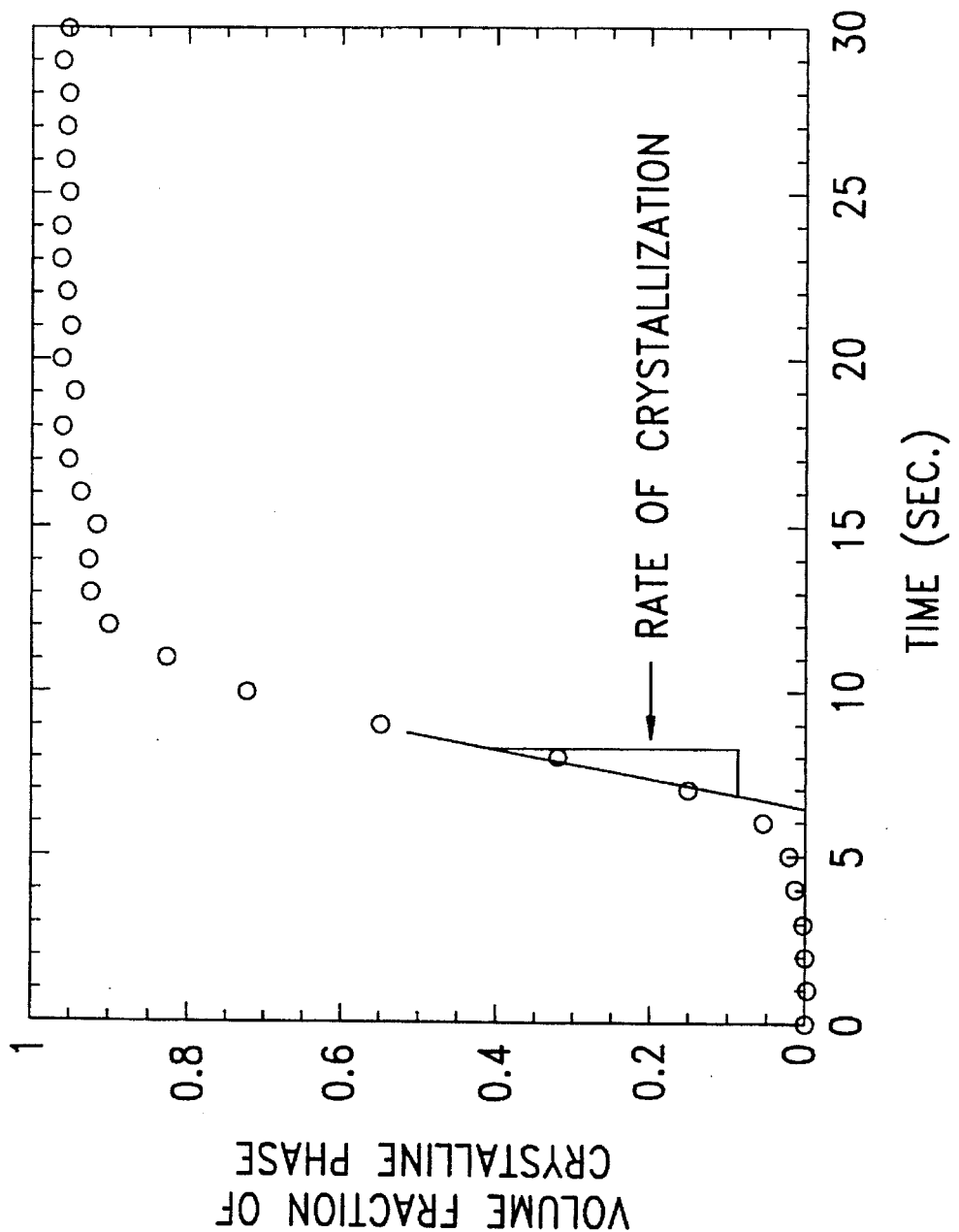

THERMOPLASTIC POLYESTER RESIN COMPOSITION

TECHNICAL FIELD

The present invention relates to a thermoplastic polyester resin composition which exhibits improved rate of crystallization and crystallinity and an excellent moldability. The thermoplastic polyester resin composition of the present invention is of course useful as an engineering molding material and, moreover, it is expected to be used for forming films and fibers.

PRIOR ART AND PROBLEMS TO BE SOLVED BY THE INVENTION

Utilizing their excellent mechanical properties, resistance to chemicals and gas barrier properties, polyester resins, particularly polyethylene terephthalate, have increased their use in various fields such as engineering molding materials. Taking the advantage of their high melting points, they are recently used in the area where heat resistance is required such as food containers which can be used even in microwave ovens and electronic components and they are expected to be used as heat-resistant materials for crystallized polyethylene terephthalate.

However, polyethylene terephthalate has a problem that its rate of crystallization is slow particularly at low temperature. Accordingly, when polyethylene terephthalate is molded at the mold temperature which is commonly used for injection molding of other plastics, i.e. at the temperature of not higher than 120° C., crystallinity on the surface and that in the inner part of the resulting molded product are different whereby the mechanical properties and the dimensional stability lack uniformity and, therefore, the product is hardly fit for actual use. Accordingly, for obtaining a molded product having a sufficient crystallinty, a method in which a mold of high temperature is used during the molding step, a method in which a crystallization nucleating agent such as talc and a crystallization promotor such as polyethylene glycol are added, etc. have been proposed.

However, although some effects in improving the crystallinity are achieved in the above-mentioned methods, the situation at present is that the rate of crystallization is still slow and the crystallinity is still insufficient too.

An object of the present invention is to provide a thermoplastic polyester resin composition in which the rate of crystallization is quick, the degree of crystallinity is high, the crystallinity is excellent and the heat resistance is improved. A particular object of the present invention is to provide a thermoplastic polyester resin composition in which there is no difference between the temperature in the inner area and that on the surface of the molded product and the crystallinity of the molded product prepared by a mold of low temperature (60°–120° C.) is improved.

MEANS TO SOLVE THE PROBLEMS

The present inventors have conducted extensive studies for achieving the above-mentioned objects and have found that, when a particular inorganic compound is added to a thermoplastic polyester resin containing a particular amount of particular sulfonate compound residue, both rate of crystallization and heat resistance are improved whereupon the present invention has been achieved.

Thus, the present invention relates to a composition comprising a thermoplastic polyester resin comprising polyester molecules ending in terminal groups, wherein all of a part of the terminal groups are the group represented by the general formula (I):

—R—SO₃L (I)

(wherein R is a divalent aliphatic or aromatic hydrocarbon having 1–20 carbon atoms and L is an alkali metal) and an inorganic compound, the energy of said composition satisfying the following formula (1) and formula (2):

$$U \leqq 1,300 \text{ (cal/mole)} \tag{1}$$

$$\sigma \times \sigma e < 2.80 \times 10^5 \text{ (cal}^2\text{m}^4\text{)} \tag{2}$$

(wherein U is an activation energy, σ is a lateral surface energy and σe is a fold surface energy).

The polyester used in the present invention is a common thermoplastic polyester resin and there is no particular limitation therefor.

Its examples are aromatic polyesters such as polyethylene terephthalate, polypropylene terephthalate, polybutylene terephthalate, polycyclohexane dimethylene terephthalate, polyoxyethoxybenzoate and polyethylene naphthalate.

In addition, polyesters in broad sense such as a polyester prepared by copolymerization of the above-mentioned polyester component with other acid component and/or glycol component (e.g. acid component such as isophthalic acid, adipic acid, sebacic acid, glutaric acid, diphenylmethanecarboxylic acid and dimeric acid; and glycol component such as hexamethylene glycol, diethylene glycol, neopentyl glycol, bisphenol A and an adduct of neopentyl glycol with alkylene oxide), a block copolymer of aromatic polyester with polyether, a block copolymer of aromatic polyester with polylactone and polyarylate. Among them, polyethylene terephthalate and polybutylene terephthalate are preferred.

The above-mentioned thermoplastic polyester resin may be a single resin, a blend, of plural resins (e.g., a blend of polyethylene terephthalate with polybutylene terephthalate) or a copolymer thereof (e.g., a polyester-polyether copolymer of polybutylene terephthalate with polytetramethylene glycol). The resin having a melting point of 200°–300° C. is particularly preferred in terms of heat resistance.

Then, in order to convert all of or a part of the terminal group(s) of the above-mentioned thermoplastic polyester to the group represented by the above-mentioned general formula (I), a sulfonate compound represented by a general formula (II) is compounded therewith in the manufacture of said polyester in any stage until completion of polymerization.

X—R—SO₃L (II)

(wherein R is a divalent aliphatic or aromatic hydocarbon having 1–20 carbon atoms; X is an ester-forming group; and L is an alkali metal)

In the divalent aliphatic hydrocarbon or aromatic hydrocarbon having 1–20 carbon atoms expressed by R in the general formula (II), the preferred ones are divalent aliphatic hydrocarbon having 1–10 carbon atoms and aromatic hydrocarbon having 6–10 carbon atoms. Specific examples of R are methylene, ethylene, butylene and phenylene.

Preferred examples of the ester-forming group represented by X are hydroxyl and carboxyl groups and a more preferred example is a hydroxyl group.

Examples of the alkali metal represented by L are lithium, potassium and sodium and, among them, sodium is preferred.

Specific examples of the sulfonate compound of the general formula (II) are sodium hydroxyethylenesulfonate, sodium hydroxybutylenesulfonate, sodium hydroxyphenylenesulfonate, sodium carboxyethylenesulfonate, sodium carboxybutylenesulfonate and sodium carboxyphenylenesulfonate. They may be used either solely or jointly as a mixture thereof.

The amount of addition of the above-mentioned sulfonate compound (II) is 0.1–10 molar % or, preferably, 0.5–10 molar % of the thermoplastic copolymerized polyester. When said amount of addition is less than 0.1 molar %, there is almost no effect of improving the rate of crystallization at low temperature (i.e. there is no improvement in movement of molecular chain) while, when it is more than 10 molar %, crystallization is greatly inhibited and that is not preferred.

The inorganic compound which is compounded in the present invention is a product prepared by heating a mixture of $M_2SiF_6$ (wherein M is an alkali metal, preferably, Li, Na or K) and talc and, preferably, it is preferred by heating a fine powdery mixture wherein their mixing ratio by weight is from 10:90 to 50:50 (preferably, from 15:85 to 40:60) to which an aluminum compound is added if necessary.

Preferred examples of $M_2SiF_6$ are $Li_2SiF_6$, $Na_2SiF_6$ and $K_2SiF_6$ and $Na_2SiF_6$ is more preferred.

$M_2SiF_6$ may be used either solely or jointly by mixing two or more. Mixing of two or more compounds is particularly preferred since there is an advantage that it is possible to control the degree of swelling in glycols during the polymerization of polyester as well as the shape of silicate of laminar structure and the aspect ratio.

Preferred examples of a mixture of two or more $M_2SiF_6$ are a mixture of $Na_2SiF_6$ and $Li_2SiF_6$ and a mixture of $Na_2SiF_6$ and $K_2SiF_6$. Instead of the above-mentioned $M_2SiF_6$, a part of $M_2SiF_6$ may be substituted with MF and a mixture of $M_2SiF_6$ and MF may be used.

Incidentally, the above-mentioned talc is mainly composed of $3MgO.4SiO_2.H_2O$ and quite often contains Al though its amount is small. In the present invention, any of commonly-used ones may be used without particular limitation. Further, an Al compound such as $Al_2O_3$ may be mixed together with $M_2SiF_6$ and talc so that the amount of Al is increased.

An example of manufacturing an inorganic compound is that each of $M_2SiF_6$ and talc in a predetermined ratio together, if necessary, with an Al compound is disintegrated in a grinding machine such as a ball mill, then mixed, the mixture is placed in a heat-resisting vessel and kept at a predetermined temperature in a heating furnace such as an electric furnace or a gas furnace for a predetermined time. It is preferred that the heating temperature is 700°–1,000° C. in view of yield, degree of swelling, etc.

The inorganic compound obtained in the above-mentioned method contains other compounds such as silicic acid and silicates in addition to the compounds represented by the general formulae (III), (IV) and (V) and their amounts vary depending upon the manufacturing conditions.

(III)

(wherein M is an alkali metal and, preferably, Li, Na or K; p is a numerical value of 0.05–0.5; and q is a numerical value of 0.1–1.0).

Specific examples thereof are fluoro silicon mica such as $Na-Mg_{2.5}Si_4O_{10}F_2$, $LiMg_{2.5}Si_4O_{10}F_2$ and $KMg_{2.5}Si_4O_{10}F_2$ and the compounds such as $Na_{0.6-0.99}Mg_{2.5-2.9}(Si_{3.8-4.0},$ $Mg_{0-0.2})O_{9.7-10.3}F_{1.7-2.3}$ and $K_{0.6-0.99}Mg_{2.5-2.9}(Si_{3.8-4.0},$ $Mg_{0-0.2})O_{9.7-10.3}F_{1.7-2.3}$.

The inorganic compound (III) may be used either solely or jointly as a mixture of two or more. When two or more substances are used, there is an advantage that it is possible to control the degree of swelling in glycols during the polymerization of polyester as mentioned later and also the shape and aspect ratio of said silicate of laminar structure. Such an advantage is preferred.

The inorganic compound (III) can be regarded as a modified form or a derivative of talc and is a silicate of a laminar structure of a 2:1 type having a three-layered structure wherein an octahedral layer containing Mg and F is sandwiched with two tetrahedral layers containing Si. Alkali ions are present in the intercalations between the adjacent three-layered structures. The silicate of a laminar structure has two types—a swellable type and an unswellable type—and includes mica in broad sense and also the compounds belonging to a category of vermiculite.

It also includes the compounds wherein a part of Si is substituted with Mg and/or Al and the substituted amount in terms of moles is preferably not more than 0.5 mole to each one mole of Mg and Si. An example is a compound represented by the general formula (IV):

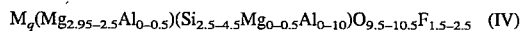
(IV)

(wherein M and q have the same meanings as defined already).

There is a possibility that a substance wherein some impurities such as Fe contained in the starting talc are partially substituted with Mg and Si is produced. However, that causes no particular problem provided that the amount is small.

With respect to the silicate of a laminar structure of a 2:1 type represented by the general formulae (III) and (IV), the silicate of a laminar structure of a 2:1 type having an interlayer charge is produced from talc which has no intercalative charge and, therefore, the alkali ions in the intercalation are in a form of a mixture of that of more than 0 and less than 1 and that the part having a three-layered structure comprising tetra- and octahedral layers is a mixture of different elemental ratios corresponding thereto. Accordingly, the composition of this compound cannot be expressed by a composition formula having a constant elemental ratio but can be expressed only by mean values, though it is believed that the compounds are mostly those belonging to mica in a broad sense and verculite. In addition, the substances in thin flakes or in the form of scales in such a small size as the particle size of talc (average particle size: about 1–50 μm) are obtained too.

Further example of the compound included in the above-mentioned inorganic compounds is that which is represented by the general formula (V).

$$MMgF_3 \qquad (V)$$

(wherein M is an alkali metal).

Preferred examples thereof are $NaMgF_3$, $LiMgF_3$ and $KMgF_3$.

The inorganic compound used in the present invention as mentioned hereinabove can be identified as the following inorganic compounds (a) and (b) in the thermoplastic polyester composition obtained by a method which will be mentioned later.

Inorganic Compound (a): an inorganic compound which is composed of M (alkali metal), Mg, Si, O and F.

Inorganic Compound (b): an inorganic compound which is composed of M (which has the same meaning as above), Mg and F only.

The fact whether the inorganic compound (a) is present can be judged from a scattering intensity at a scattering angle of 2θ=7.1°. The fact whether the inorganic compound (b) is present can be judged from a scattering intensity at a scattering angle of 2θ=23.1°.

In addition, their existing ratio can be quantitatively determined by a ratio of intensity at each of those scattering angles.

In view of the surfacial properties and the fluidity during the molding, the preferred compounding amounts of the thermoplastic polyester resin and the inorganic compound in the present invention are that 0.01–100 parts by weight or, more preferably, 0.1–25 parts by weight of the inorganic compound to 100 parts by weight of the thermoplastic copolymerized polyester resin.

Incidentally, particle size of the inorganic compound may be selected depending upon the use and requested properties of the thermoplastic copolymer polyester composition. Fine particles are usually preferred and the average particle size is not larger than about 10 μm or, more preferably, not larger than 5 μm.

Now, in manufacturing the composition of the present invention, conventional methods of manufacturing thermoplastic polyesters are used except that an inorganic compound is previously dispersed in a glycol (which is a material for the polyester) to swell it. There is no particular limitation for the catalyst and additives such as delusterant and stabilizer used at that time.

In the present invention, dispersion of the inorganic compound is not carried out using common kneaders but is conducted during the polymerization of polyester resin so that the inorganic compound is homogeneously dispersed in the polyester resin to improve the crystallinity.

Preferred examples of the above-mentioned glycol are those which are the same as the materials for the thermoplastic polyester resin such as ethylene glycol and butylene glycol.

There is no particular limitation for a method of swelling the inorganic compound by dispersing in glycols but any method may be applied. Examples of the applicable method are a method in which the inorganic compound is immersed for long time, a method in which a dispersion of the inorganic compound in the glycol is heated with stirring and a method in which ultrasonic treatment or shaking is utilized. At that time, another compound represented by a general formula (II) which is a copolymerizing component may be added thereto simultaneously and that is rather preferred.

The composition of the present invention prepared as such has a characteristic feature that the value of each energy of said composition satisfies the following formulae (1) and (2).

$$U \leq 1{,}300 \text{ (cal/mole)} \quad (1)$$

$$\sigma \times \sigma e \leq 2.80 \times 10^5 \text{ (cal}^2/\text{m}^4) \quad (2)$$

(wherein U is an activation energy, σ is a lateral surface energy and σe is a fold surface energy)

In the present invention, U and σ×σe are calculated as follows.

(1) First, a small piece is cut out from the sample, sandwiched between two cover glasses, melted at 300° C. for three minutes, the resulting thin flake (up to 20 μm) was quickly cooled to the predetermined temperature (Tc: crystallization temperature) on a hot plate, the angular distribution of the Hv intensity during the course of isothermic crystallization is incorporated into aligned 46 photodiodes arrays and scattering vector (q) and scattering intensity (I) obtained by a time-resolved measurement are determined whereupon the volume fraction of the crystal phase (Q) with a lapse of time is calculated from the following formula (1). Incidentally He—Ne laser (wavelength: 632.8 nm) is used as a light source. An example of the relation between Q and time is given in FIG. 1.

$$Q = \int_0^\infty Iq^2 dq \quad (1)$$

(2) Then the initial stage is applied to the Avrami's formula (2) to calculate a crystallization rate constant k and Avrami index n and, from the formula (3), linear growth rate is calculated.

$$Q/Q_\infty = 1 - e^{-kt^n} \quad (2)$$

$$G \propto k^{1/n} \quad (3)$$

In the formula (2), t is time and $Q_\infty$ is a volume fraction of the crystal phase when saturated at t=∞.

(3) Values of G at each temperature are calculated and the above-mentioned values are plotted using the following Hoffman-Lauritzen's formula (4) to determine $G_0$, U and a σ×σe.

$$G = G_0 \cdot \exp\left\{ \frac{-U}{Rg(Tc - Tg + 30)} \right\} \cdot \exp\left( \frac{-K}{Tc \cdot \blacktriangle Tf} \right) \quad (4)$$

In the formula, U is an activation energy, G is a linear growth rate, $G_0$ is a pre-exponential factor, Rg is a gas constant (cal.k$^{-1}$.mole$^{-1}$), Tc is a crystallization temperature (° K), Tg is a glass transition temperature (° K), ▲T is (Tm$^0$–Tc wherein Tm$^0$ is an equilibrium melting point) and f and K are the values calculated by the following formulae (5) and (6).

$$f = (2Tc)/Tm^0 + Tc) \quad (5)$$

$$K = (abo \cdot \sigma \sigma e \cdot Tm^0)/(\blacktriangle Hf \cdot k) \quad (6)$$

In the formula (6), a is a constant to a mode of crystallization (in the case of regimes III and I, a=4 while, in the case of regime II, a=2), bo is a thickness of the stem, ΔHf is heat of fusion and k is a Boltzmann constant.

In order to improve the crystallinity of the surface of the molded product in molding the composition of the present invention, an α-olefinic copolymer having functional groups which react or interact with polyester resin may be further compounded with said composition.

Specific examples of an α-olefinic copolymer having functional groups which react or interact with the thermoplastic polyester resin are copolymers of α-olefin with α,β-unsaturated carboxylic acids. Said copolymers may be any of random copolymer, block copolymer, graft copolymer, alternating copolymer and others.

Examples of the α-olefin are α-olefins having 2–4 carbon atoms such as ethylene, propylene and butene-1. Among them, ethylene is preferred since it has a high polymerizability giving polymers of high molecular weight.

Examples of α, β-unsaturated carboxylic acid are acrylic acid, methacrylic acid, itaconic acid and maleic acid.

Examples of the above-mentioned functional groups in the α-olefinic copolymer which react with the thermoplastic polyester resin are epoxy group, carboxyl group and acid anhydride group (i.e. oxycarbonyl group).

The above-mentioned α-olefinic copolymer may also be made to react with a monomer having functional groups which react with the thermoplastic polyester resin. Examples of said monomer are glycidyl methacrylate, fumaric acid and maleic anhydride.

Incidentally, derivatives of the α,β-unsaturated carboxylic acid having functional groups which interact with the thermoplastic polyester resin are ionic compounds prepared by the reaction of the above-mentioned unsaturated carboxylic acid with monovalent or divalent metal compound.

α-Olefinic component in the α-olefinic copolymer is preferably not less than 50% molar % or, more preferably, not less than 80 molar %. The functional groups occupy 0.1–50 molar % of the α-olefinic copolymer. It is preferred that not less than 10 molar % of the carboxyl group is neutralized with sodium, potassium, zinc, etc.

Preferred specific examples of the α-olefinic copolymer are sodium salts of copolymers of ethylene with methacrylic acid such as a series of polymers available from E. I. du Pont under a tradename of "Surlyn" and copolymers of ethylene with glycidyl methacrylate such as "Bond Fast" available from Sumitomo Chemical.

The compounding amount of the α-olefinic copolymer to 100 parts by weight of total amount of the thermoplastic polyester resin and the inorganic compound is 0.1–20 parts by weight, preferably 0.5–10 parts by weight or, more preferably, 1–5 parts by weight. When said amount is less than 0.1 part by weight, achievement of the effect of the present invention is insufficient while, when it exceeds 30 parts by weight, mechanical properties of the thermoplastic polyester resin acting as a matrix are lowered. Thus, each of the above-mentioned out-of-ranges is not preferred.

In addition to the above-mentioned components (i.e. thermoplastic polyester resin and inorganic compound), other additives such as reinforcing agents (e.g. talc, wollastonite, montmorillonite and glass fiber), flame retardants, releasing agents, light stabilizers, heat stabilizers, plasticizers, antistatic agents and coloring agents may be added if necessary unless that is against the object of the present invention. It is preferred that such additives are added after, instead of during, the polymerization of the polyester resin.

It is preferred that compounding of the α-olefinic copolymer is conducted by means of melting and kneading with the thermoplastic polyester resin using an extruder.

The present invention will be further illustrated by way of the following examples although the present invention is not limited thereto.

Each of the characteristic values in the examples is measured by the following methods.

Intrinsic Viscosity: This is measured in a mixed solvent of phenol and tetrachloroethane (6:4 by weight) at 30° C.

Rate of Crystallization: This is a value measured by analysis of the crystallization process by means of a time-resolved light-scattering measurement. FIG. 1 is a graph showing an example of the crystallization process and the rate of crystallization in which the ordinate is a volume fraction of the crystalline phase (wherein the volume fraction after completion of crystallization is set at 1) while the abscissa is time (wherein the time when the melted sample is placed on a hot plate of a crystallizing temperature is set at 0). The curve in FIG. 1 shows a progress that the crystals begin to grow after the induction time since the time 0, then the sample is filled with crystalline phase and the crystallization is finished. The slope of the curve when the crystals grow is defined as a rate of crystallization.

Crystallinity: Amorphous sample prepared by a sudden cooling of the melted sample in liquid nitrogen is heated at the rate of 20° C./minute starting from room temperature using a differential scanning calorimeter whereupon crystallization is carried out during the course of heating and crystallinity is determined from the heat of fusion of the resulting crystalline phase using the following formula.

$$\text{Crystallinity} = \frac{\text{Heat of Fusion (J/g)}}{122 \text{ (J/g)}} \times 100 \text{ (\%)}$$

Flexural Strength: Measured in accordance with ASTM D-790.

Tensile Strength: Measured in accordance with ASTM D-638.

EXAMPLES 1–7 AND COMPARATIVE EXAMPLES 1–2.

A fine powdery mixture of talc and sodium silicofluoride ($Na_2SiF_6$) in a ratio (by weight) as shown in Table 1 was heated in an electric furnace at 900° C. for about one hour to give a heated product and that was used as an inorganic compound (Somasif manufactured by CO-OP Chemical). Said inorganic compound (10 g) was dispersed in 540 g of each ethylene glycol, then a predetermined amount of sodium hydroxyethylenesulfonate (which is a component for the terminal group) was added and the mixture was stirred at room temperature for 60 minutes. This was introduced into an autoclave equipped with a stirring device, kept at 90° C., then 500 g of dimethyl terephthalate and the above-mentioned component for the terminal group were added to the system and the mixture was subjected to an ester exchange reaction followed by subjecting to a polymerization in the usual manner to give a thermoplastic polyester resin composition in which polyethylene terephthalate was a main component.

In Comparative Example 1, polyethylene terephthalate to which neither terminal group component nor inorganic compound was added was used as a polyester and, in Comparative Example 2, only polybutylene terephthalate was used.

TABLE 1

| | Talc/$Na_2SiF_6$ | | Component |
| | Compounding Ratio (ratio by weight) | Amount (parts by weight) | of Terminal Group |
| --- | --- | --- | --- |
| Example | | | |
| 1 | 70/30 | 1 | 0.5 |
| 2 | 70/30 | 1 | 1 |
| 3 | 70/30 | 1 | 3 |
| 4 | 82.5/17.5 | 1 | 1 |
| 5 | 82.5/17.5 | 1 | 2 |
| 6 | 82.5/17.5 | 1 | 1.5 |
| 7 | 82.5/17.5 | 1 | 3 |
| Comp. Ex. | | | |
| 1 | — | 0 | 0 |
| 2 | — | 0 | 0 |

Characteristic values of each of the prepared compositions were measured and the results are given in Table 2.

TABLE 2

|  | Intrinsic Viscosity (dl/g) | Rate of Crystallization (sec$^{-1}$) | | | | Activation Energy (U) (cal/mole) | $\sigma.\sigma e \times 10^{-5}$ (cal$^2$/m$^4$) | Crystallinity (% by wt) | Heat Distortion Temperature (°C.) 4.6 kgf/cm$^2$ |
| --- | --- | --- | --- | --- | --- | --- | --- | --- | --- |
|  |  | 120 | 130 | 181 | 200° C. | | | | |
| Example | | | | | | | | | |
| 1 | 0.60 | 0.010 | 0.040 | 0.400 | 0.300 | 1200 | 2.68 | 26 | 138 |
| 2 | 0.60 | 0.020 | 0.070 | 0.570 | 0.330 | 1136 | 2.60 | 25 | 140 |
| 3 | 0.60 | 0.025 | 0.070 | 0.650 | 0.320 | 1060 | 1.70 | 25 | 160 |
| 4 | 0.60 | 0.021 | 0.076 | 0.574 | 0.329 | 1125 | 2.65 | 24 | 140 |
| 5 | 0.61 | 0.014 | 0.042 | 0.403 | 0.205 | 1071 | 1.78 | 25 | 169 |
| 6 | 0.60 | 0.015 | 0.050 | 0.500 | 0.300 | 1100 | 2.00 | 24 | 145 |
| 7 | 0.60 | 0.025 | 0.070 | 0.600 | 0.330 | 1050 | 1.60 | 25 | 160 |
| Comp. Ex. | | | | | | | | | |
| 1 | 0.60 | 0.005 | 0.005 | 0.069 | 0.069 | 1384 | 2.98 | 23 | 135 |
| 2 | 1.00 | 0.080 | 0.120 | 0.230 | 0.110 | 1500 | 0.74 | 30 | 160 |

(Note: Data may be amended later.)

EXAMPLES 8–13 AND COMPARATIVE EXAMPLE 3.

An inorganic compound prepared by heating a mixture of 17.5 parts by weight of $Na_2SiF_6$ and 82.5 parts by weight of natural talc at 900° C. for one hour was dispersed in ethylene glycol, then sodium hydroxyethylenesulfonate (a component for terminal group) was added thereto and the mixture was stirred at room temperature for 60 minutes. This was introduced into an autoclave equipped with a stirring device, kept at 90° C., subjected to an ester exchange reaction by adding dimethyl terephthalate to the system and a polymerization reaction was carried out by a usual manner to give a composition of thermoplastic polyester resin mainly comprising polyethylene terephthalate. Then this was compounded with an α-olefinic copolymer at 200° C. using a kneader. Compounding amount of the inorganic compound, compounding amount of the copolymerizing component and type and compounding amount of the α-olefinic copolymer are given in Table 3.

TABLE 3

|  | Compdg Amt of Inorganic Compound (parts by wt) | Compdg Amt of Component of Terminal Group (part by wt) | Type and Compdg Amt of α-Olefinic Copolymer | |
| --- | --- | --- | --- | --- |
|  |  |  |  | (parts by wt) |
| Example | | | | |
| 8 | 2 | 1 | Surlyn #1707 | 0.5 |
| 9 | 2 | 1 | " | 1 |
| 10 | 2 | 1 | " | 3 |
| 11 | 2 | 1 | Bond Fast | 1 |
| 13 | 2 | 1 | " | 3 |
| Comp. Ex. | | | | |
| 3 | 2 | 0 | Surlyn #1707 | 1 |

Remarks:

Surlyn #1707: Sodium salt of a copolymer of ethylene and methacrylic acid (manufactured by E. I. du Pont)

Bond Fast: A copolymer of ethylene and glycidyl methacrylate (manufactured by Sumitomo Chemical)

Each of the characteristic values of the compositions prepared hereinabove was measured and the results are given in Table 4.

TABLE 4

| | Intrinsic Viscosity (dl/g) | Temp of Mold for achieving 15% Crystallinity | Heat Distorsion Temperature (°C.) 4.6 kgf/cm² | Flexural Strength (kg/mm²) | Tensile Strength (mg/mm²) | Activation Energy (U) (cal/mole) | $\sigma \times \sigma e \times 10^{-5}$ (cal²/m⁴) |
|---|---|---|---|---|---|---|---|
| Example | | | | | | | |
| 8 | 0.60 | 83 | 150 | 10.5 | 6.6 | 1100 | 2.50 |
| 9 | 0.59 | 80 | 144 | 9.8 | 6.0 | 1120 | 2.45 |
| 10 | 0.57 | 79 | 140 | 10.3 | 6.4 | 1125 | 2.52 |
| 11 | 0.55 | 78 | 140 | 9.3 | 5.9 | 1085 | 2.33 |
| 12 | 0.61 | 81 | 143 | 9.8 | 5.8 | 1133 | 2.40 |
| 13 | 0.60 | 79 | 145 | 9.7 | 5.7 | 1130 | 2.40 |
| Comp. Ex. | | | | | | | |
| 3 | 0.58 | 126 | 135 | 10.1 | 5.2 | 1350 | 2.87 |

MERIT OF THE INVENTION

The thermoplastic copolymerized polyester resin composition of the present invention has a quick rate of crystallization, a high degree of crystallinity, an excellent crystallinity and an improved heat resistance. Thus, when a sulfonate compound is bonded to the terminal group of the thermoplastic polyester, there is a further improvement in the rate of crystallization at low temperature. Accordingly, when the composition of the present invention is used, a molded product with an excellent dimensional stability is obtained and the composition of the present invention can be used not only as a molding engineering material but also for forming films and fibers. It is particularly expected to utilize it for forming films with improved gas barrier properties and water absorbing ratio.

What we claim is:

1. A composition comprising:

a thermoplastic polyester resin comprising polyester molecules ending in terminal groups, wherein all or a part of the terminal groups are represented by the general formula (I):

$$-R-SO_3L \quad (I)$$

wherein R is a divalent aliphatic hydrocarbon having 1–20 carbon atoms and L is an alkali metal, and wherein 0.1–10 molar percent of said resin is derived from the compound represented by the general formula (II):

$$X-R-SO_3L \quad (I)$$

wherein X is an ester-forming group; and for each 100 parts by weight of said resin, 0.01–100 parts by weight of an inorganic compound mixture, wherein said inorganic compound mixture comprises one or more compounds selected from the group consisting of: inorganic compounds consisting of M, Mg, Si, O and F and inorganic compounds consisting of M, Mg and F, wherein M is an alkali metal;

the energy of said composition satisfying the following formula (1) and formula (2):

$$U \leq 1,300 \text{ (cal/mole)} \quad (1)$$

$$\sigma \times \sigma e < 2.80 \times 10^5 \text{ (cal}^2\text{m}^4\text{)} \quad (2)$$

wherein U is an activation energy, σ is a lateral surface energy and σe is a fold surface energy.

2. A thermoplastic polyester resin composition as claimed in claim 1 wherein the inorganic compound mixture is a product obtainable by heating a fine powdery mixture of $M_2SiF_6$ and talc in which the mixing weight ratio of $M_2SiF_6$ and talc is 10:90–50:50.

3. A thermoplastic polyester resin composition as claimed in claim 1 wherein the inorganic compound mixture is the product obtained by heating a fine powdery mixture containing $M_2SiF_6$ wherein M represents an alkali metal, talc and an Al compound.

4. A thermoplastic polyester composition as claimed in claim 1 wherein the inorganic compound mixture comprises one or more compounds selected from the group consisting of: a silicate of laminar structure represented by the formula (III):

$$M_q Mg_{(3-p)} Si_{(3.5-4.5)} O_{(9.5-10.5)} F_{(1.5-2.5)} \quad (III)$$

wherein M represents an alkali metal, p is a numerical value of 0.05–0.5 and q is a numerical value of 0.1–1.0;

a silicate of laminar structure represented by the formula (IV):

$$M_q(Mg_{2.95-2.5}Al_{0-0.5})(Si_{2.5-4.5}Mg_{0-0.5}Al_{0-10})O_{9.5-10.5}F_{1.5-2.5} \quad (IV)$$

wherein M is an alkali metal and q is a numerical value of 0.1–1.0;

and a compound represented by the formula (V):

$$MMgF_3 \quad (V)$$

wherein M represents an alkali metal.

5. A composition as claimed in claim 1 which further comprises an α-olefinic copolymer having one or more functional groups which are reactive with or mutually active with the polyester resin.

6. The composition of claim 3, wherein said Al compound is $Al_2O_3$.

* * * * *